United States Patent
Bos et al.

(10) Patent No.: US 10,516,541 B2
(45) Date of Patent: Dec. 24, 2019

(54) NONCE TO MESSAGE BINDING IN DIGITAL SIGNATURE GENERATION

(71) Applicant: NXP B.V., Eindhoven (NL)

(72) Inventors: Joppe Willem Bos, Wijgmaal (BE); Jan Hoogerbrugge, Helmond (NL); Wilhelmus Petrus Adrianus Johannus Michiels, Reusel (NL); Rudi Verslegers, Genk (BE)

(73) Assignee: NXP B.V., Eindhoven (NL)

( * ) Notice: Subject to any disclaimer, the term of this patent is extended or adjusted under 35 U.S.C. 154(b) by 181 days.

(21) Appl. No.: 15/703,597

(22) Filed: Sep. 13, 2017

(65) Prior Publication Data
US 2019/0081797 A1    Mar. 14, 2019

(51) Int. Cl.
| | |
|---|---|
| *H04L 29/00* | (2006.01) |
| *H04L 9/32* | (2006.01) |
| *H04L 9/00* | (2006.01) |
| *H04L 9/06* | (2006.01) |
| *H04L 29/06* | (2006.01) |
| *H04L 9/30* | (2006.01) |

(52) U.S. Cl.
CPC ............ *H04L 9/3252* (2013.01); *H04L 9/002* (2013.01); *H04L 9/0643* (2013.01); *H04L 9/3066* (2013.01); *H04L 63/123* (2013.01)

(58) Field of Classification Search
CPC ...... H04L 9/3252; H04L 9/002; H04L 9/0643
USPC ........................................ 713/176
See application file for complete search history.

(56) References Cited

U.S. PATENT DOCUMENTS

| | | | |
|---|---|---|---|
| 2013/0024699 A1* | 1/2013 | Muir | H04L 9/002 713/176 |
| 2015/0350171 A1 | 12/2015 | Brumley | |

FOREIGN PATENT DOCUMENTS

| | | |
|---|---|---|
| WO | 2014075000 A1 | 5/2014 |

OTHER PUBLICATIONS

Schnorr, Efficient Identification and signatures for smart cards, Advances in Cryptology (1989) Proc., Lecture Notes in Comp.Sci., vol. 435, Springer, 1989, pp. 239-252.
Neal Koblitz, Elliptic curve cryptosystems, Mathematics of Computation 48 (1987), No. 177, 203-209.
Chow et al., A white-box DES implementation for DRM applications, Digital Rights Management—DRM 2002—Lecture Notes in Computer Science, vol. 2696, Springer, 2003, pp. 1-15.
Chow et al., White-box cryptography and an AES implementation, Selected Areas in Cryptography—SAC 2002—Lecture Notes in Computer Science, vol. 2595, Springer, 2003, pp. 250.
U.S. Dept. Comm. /National Institute of Standards and Technology, Digital Signature Standard (DSS), FIPS-186-4, 2013, http://nvlpubs.nist.gov/nistpubs/FIPS/NIST.FIPS.186-4.pdf.
Miller, Use of elliptic curves in cryptography, Crypto 1985, Lecture Notes in Computer Science, vol. 218, Springer, Heidelberg, 1986, pp. 417-426.

* cited by examiner

*Primary Examiner* — Jeffrey C Pwu
*Assistant Examiner* — Michael D Anderson

(57) ABSTRACT

Various embodiments relate to a method for producing a digital signature using a white-box implementation of a cryptographic digital signature function, including: receiving a input message; hashing the input message; generating a nonce based upon the input message and the white-box implementation of the cryptographic digital signature function; and computing a digital signature of the input using the nonce.

18 Claims, 1 Drawing Sheet

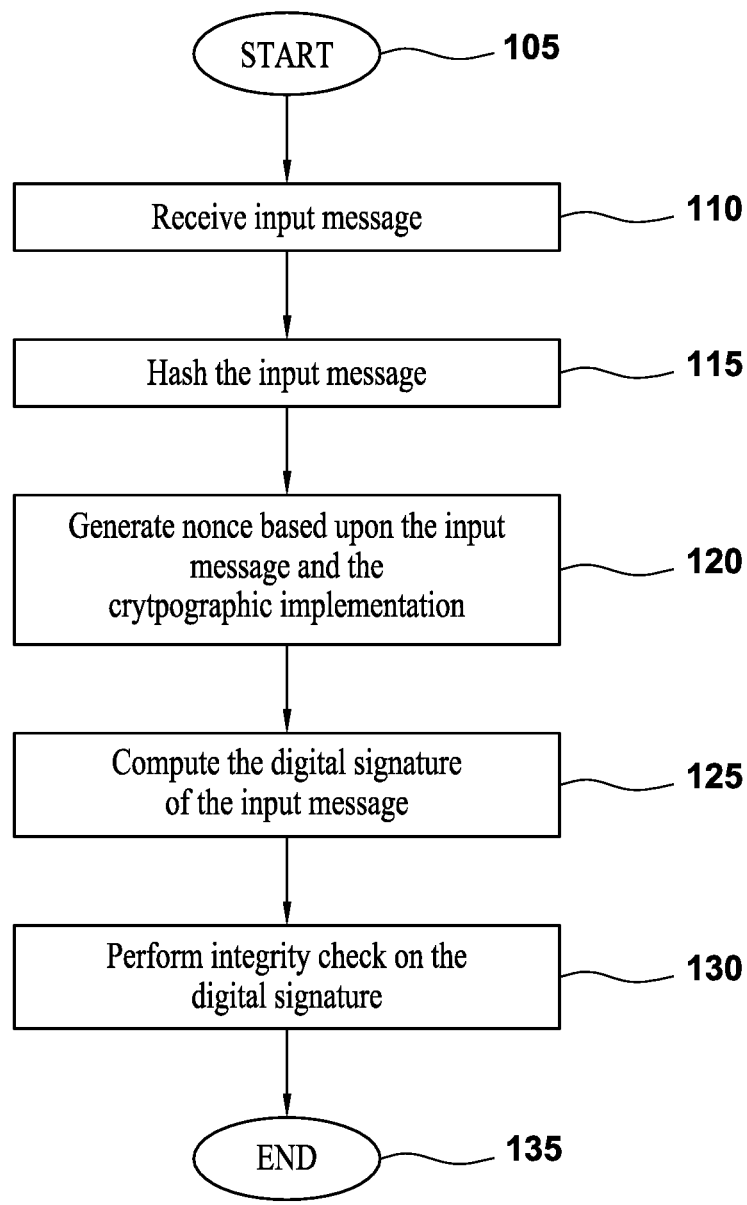

NONCE TO MESSAGE BINDING IN DIGITAL SIGNATURE GENERATION

TECHNICAL FIELD

Various exemplary embodiments disclosed herein relate generally to strengthening the security of the digital signature generation algorithm against attack in a white-box attack environment.

BACKGROUND

White-box cryptography is aimed at protecting secret keys from being disclosed in a software implementation of a cryptographic or secure function. In such a context, it is assumed that the attacker (usually a "legitimate" user or malicious software) may also control the execution environment of the software implementation. This is in contrast with the more traditional security model where the attacker is only given a black-box access (i.e., inputs/outputs) to the cryptographic function under consideration.

The main idea of white-box implementations is to rewrite a key-instantiated version so that all information related to the key is hidden in the software implementation of the cryptographic or secure function. In other words, for each secret key, a key-customized software is implemented so that the key input is unnecessary. In other embodiments, the secret key may be an input to the white-box implementation. In such a case the key may be encoded.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for producing a digital signature using a white-box implementation of a cryptographic digital signature function, including: receiving a input message; hashing the input message; generating a nonce based upon the input message and the white-box implementation of the cryptographic digital signature function; and computing a digital signature of the input using the nonce.

Further various embodiments relate to a non-transitory machine-readable storage medium encoded with instructions for execution by a processor for producing a digital signature using a white-box implementation of a cryptographic digital signature function, including instructions for receiving a input message; instructions for hashing the input message; instructions for generating a nonce based upon the input message and the white-box implementation of the cryptographic digital signature function; and instructions for computing a digital signature of the input using the nonce.

Various embodiments are described, wherein cryptographic digital signature function is based upon the digital signature algorithm (DSA) cryptographic protocol.

Various embodiments are described, wherein cryptographic digital signature function is based upon the elliptic curve digital signature algorithm (ECDSA) protocol.

Various embodiments are described, wherein generating a nonce based upon the input message and the white-box implementation of the cryptographic digital signature function includes calculating the nonce u as $u=f(\delta, e)$ where $f: \mathbb{Z} \times \mathbb{Z} \to \mathbb{Z}/n\mathbb{Z}$ is a function which deterministically computes a random value based on the hashed message e and some entropy value $\delta$.

Various embodiments are described, wherein the entropy value $\delta$ based upon the input message is used to select bits for the nonce u from the white-box implementation of the cryptographic digital signature function.

Various embodiments are described, wherein the entropy value $\delta$ is based upon the hash of the input message input message.

Various embodiments are described, wherein computing a digital signature of the input using the nonce includes computing $s=u^{-1}(e+dr) \bmod n$, where s is first part of the digital signature of the input message, u is the nonce, e is the hash of the input message, d is a private key, r is a calculated remainder that is a second part of the digital signature, and n is a secret integer.

Various embodiments are described, wherein where the remainder r is calculated as using an elliptic curve point multiplication.

Various embodiments are described, wherein where the remainder r is calculated as using a modular exponentiation function.

Various embodiments are described, further including performing an integrity check on the digital signature based upon nonce.

BRIEF DESCRIPTION OF THE DRAWINGS

In order to better understand various exemplary embodiments, reference is made to the accompanying drawings, wherein:

FIG. 1 illustrates a method of signing a message.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A method to strengthen the security of the digital signature generation algorithm against a family of attacks in the white-box attack model where the nonce re-usage can lead to key extraction is described herein. This method is useful in constructing digital signatures based on standardized asymmetric cryptographic schemes in the white-box cryptography environment.

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

Generating digital signatures is one of the cornerstones of the modern security infrastructure. One of the standardized and popular approaches is based on the algebraic structure of elliptic curves over finite fields. One of the key features of elliptic curve cryptography (ECC) is the significantly smaller key-sizes as compared to, for instance, asymmetric cryptographic systems based on RSA.

Let $F_p$ denote a finite field of prime cardinality p>3. Any a,b$\in$F, with $4a^3+27b^2\neq0$ define an elliptic curve $E_{a,b}$ over $F_p$. The group of points $E_{a,b}(F_p)$ of $E_{a,b}$ over $F_p$ is defined as the zero point along with the set of pairs (x, y)$\in F_p \times F_p$ that satisfy the short Weierstrass equation:

$$y^2 = x^3 + ax + b \tag{1}$$

Computing digital signatures using the multiplicative structure of finite fields is shown on the left part of Algorithm 1. Using the variant which uses the additive structure of elliptic curves is recalled on the right side in Algorithm 1 illustrated below. Algorithm 1 describes the computation of digital signatures using both the RSA (digital signature algorithm or DSA) and ECC (elliptic curve digital signature algorithm or ECDSA) cryptographic methods. This is the elliptic curve variant of the digital signature algorithm as standardized by the U.S. Department of Commerce National Institute of Standards and Technology. It is further noted, that the ECDSA may be used with elliptic curves where the order is not prime.

Algorithm 1 Given a cryptographic hash function $\mathcal{H}$ and a message m $\in \mathbb{Z}$ compute the (EC)DSA signature generation. The left algorithm shows DSA and uses the domain parameters (p, q, g), where p and q are prime such that q divides p − 1 and g $\in$ [1, p − 1] has order q, and a private key d $\in \mathbb{Z}/q\mathbb{Z}$. The right algorithm shows ECDSA and uses a public point P $\in E(\mathbb{F}_p)$ of order n $\in \mathbb{Z}$, and a private key d $\in \mathbb{Z}/n\mathbb{Z}$. Both algorithms output the signature (r, s).

| 1: function DSA_SIGN((m, d, {p, q, g})) | 1: function ECDSA_SIGN((m, d, {P, n})) |
|---|---|
| 2:    Compute e = $\mathcal{H}$(m) | 2:    Compute e = $\mathcal{H}$(m) |
| 3:    repeat | 3:    repeat |
| 4:       repeat | 4:       repeat |
| 5:          Select u $\in_R$ [1, q − 1] | 5:          Select u $\in_R$ [1, n − 1] |
| 6:          Compute T = $g^u$ mod p | 6:          Compute uP = (x, y) |
| 7:          Compute r = T mod q | 7:          Compute r = x mod n |
| 8:       until r $\neq$ 0 | 8:       until r $\neq$ 0 |
| 9:          Compute s = $u^{-1}$(e + dr) mod q | 9:          Compute s = $u^{-1}$(e + dr) mod n |
| 10:   until s $\neq$ 0 | 10:   until s $\neq$ 0 |
| 11:   return (r, s) | 11:   return (r, s) |

In step 5 of the standard algorithm, the value u is sampled at random; the value u is called the nonce (which is a per-message secret value) and has the same security requirements as the secret key d. If u is known to an attacker one can compute the secret key d because $$d = r^{-1}(us - e) \bmod n, \qquad (2)$$

and all the r, s, e, and n are all publicly known. Moreover, this random nonce value of u should be used only once. If a given value of u is used twice to generate signatures of two different messages $m_1$ and $m_2$ then an attacker may compute this secret nonce value u. Given two signatures which are signed with the same value of u: $(r, s_1)$ and $(r, s_2)$. Then $$u \equiv (s_1 - s_2)^{-1}(e_1 - e_2) \pmod{n}$$

where $e_1 = \mathcal{H}(m_1)$ and $e_2 = \mathcal{H}(m_2)$ and it is assumed that $s_1 - s_2 \not\equiv 0 \pmod{n}$. After u has been computed the secret key can be retrieved using equation (2) above.

The current standardized digital signature algorithms such as DSA and ECDSA have an inherent requirement that the random nonce should be different when signing different messages. This is hard to guarantee in the white-box attack model. If this requirement fails then an attacker can easily compute the secret key used in the white-box implementation. Embodiments are described below that include a number of countermeasures describing how to bind the nonce value to the input message in order to thwart such families of attacks.

In the embodiments described below, line 9 of the both versions of the signature algorithm will be computed differently from the standard version. When computing the value of $$u^{-1}(e + dr) \bmod n$$

the random nonce u will be computed as $u = f(\delta, e)$ where $f: \mathbb{Z} \times \mathbb{Z} \to \mathbb{Z}/n\mathbb{Z}$ is a function which deterministically computes a random value based on the hashed message e and some entropy value $\delta$.

Building on top of this, the function $f$ is constructed such that the white-box implementation may utilize a validation function g to check whether the operations have been computed correctly. An example of such a function would be to compute a Boolean value $g(f(\delta, e), e)$ based on a function $g: \mathbb{Z} \times \mathbb{Z} \to \{0,1\}$. This function could, for instance, verify some internal state of the secure software implementation or its surroundings based on the hashed message e and the produced random nonce. Hence, this additional functionality of g allows for integrity checking within the white-box implementation itself in order to thwart certain types of software fault attacks or other integrity attacks.

An example of one way to define this function $f$ is to use the hashed message e, potentially in combination with the plain input message m to set the entropy value $\delta$ to derive the deterministic random value by selecting bits from the large look-up tables used by the white-box implementation or from the executable code. For example the entropy value $\delta$ may specify a location in the executable code from which a defined number of bits are selected. Also, the bits may be selected in various patterns, for example contiguously or in groups of bits separated by a fixed number of bits. Also the $\delta$ may be used to determine the number of bits selected. Various other schemes may be used to implement the function $f$ based upon the input message m. Because the look-up tables and executable code does not change over time this ensures that the same message m and therefore the same hashed message e result in the same deterministic pseudo-random nonce $u = f(\delta, e)$. In this scenario the validation function g checks at a later stage in the white-box execution if the selected nonce is correct by doing a mapping to the bits in the look-up table and the executable code.

FIG. 1 illustrates a method of signing a message. The method 100 starts 105 and then receives an input message to be signed 100. Next, the method 100 performs a hash function on the input message 115. The method 100 then generates a nonce based upon the input message and the cryptographic implementation of the digital signature 120. This may be accomplished as described above by calculating $u = f(\delta, e)$, where $f: \mathbb{Z} \times \mathbb{Z} \to \mathbb{Z}/n\mathbb{Z}$ is a function which deterministically computes a random value based on the hashed message e and some entropy value $\delta$ as described above. Next, the method 100 computes the digital signature of the input message using the generated nonce 125. This may be done as described above in Algorithm 1 using either the DSA or ECDSA digital signature protocol. Finally, the method 100 performs an integrity check on the digital signature 130. This integrity check may be accomplished as described above and provides an indication as to whether the digital signature has been tampered with. The method 100 then ends 135.

The embodiments described herein are useful when computing digital signatures in an environment where the cryptographic keys need to be protected in software from local and remote attacks such as malicious software. Target platforms may include, for example, mobile devices and in the setting of the internet of things.

The method described above may be run on various systems that include a processor and storage that includes stored computer instructions for implementing the white-box cryptographic function. Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for producing a digital signature using a white-box implementation of a cryptographic digital signature function, comprising:
   receiving an input message;
   hashing the input message;
   calculating a nonce u as $u = f(\delta, e)$ where $f: \mathbb{Z} \times \mathbb{Z} \to \mathbb{Z}/n\mathbb{Z}$ is a function that deterministically computes a random value based on the hashed message e and some entropy value $\delta$; and
   computing a digital signature of the input using the nonce.

2. The method of claim 1, wherein cryptographic digital signature function is based upon the digital signature algorithm (DSA) cryptographic protocol.

3. The method of claim 1, wherein cryptographic digital signature function is based upon the elliptic curve digital signature algorithm (ECDSA) protocol.

4. The method of claim 1, wherein the entropy value $\delta$ based upon the input message is used to select bits for the nonce u from the white-box implementation of the cryptographic digital signature function.

5. The method of claim 4, wherein the entropy value $\delta$ is based upon the hash of the input message input message.

6. The method of claim 1, wherein computing a digital signature of the input using the nonce includes computing $s=u^{-1}(e+dr) \mod n$, where s is first part of the digital signature of the input message, u is the nonce, e is the hash of the input message, d is a private key, r is a calculated remainder that is a second part of the digital signature, and n is a secret integer.

7. The method of claim 6, wherein where the remainder r is calculated as using an elliptic curve point multiplication.

8. The method of claim 6, wherein where the remainder r is calculated as using a modular exponentiation function.

9. The method of claim 1, further comprising performing an integrity check on the digital signature based upon nonce.

10. A non-transitory machine-readable storage medium encoded with instructions for execution by a processor for producing a digital signature using a white-box implementation of a cryptographic digital signature function, comprising:
    instructions for receiving an input message;
    instructions for hashing the input message;
    instructions for calculating a nonce u as $u=f(\delta, e)$ where $f: \mathbb{Z} \times \mathbb{Z} \to \mathbb{Z}/n\mathbb{Z}$ is a function that deterministically computes a random value based on the hashed message e and some entropy value $\delta$; and
    instructions for computing a digital signature of the input using the nonce.

11. The non-transitory machine-readable storage medium of claim 10, wherein cryptographic digital signature function is based upon the digital signature algorithm (DSA) cryptographic protocol.

12. The non-transitory machine-readable storage medium of claim 10, wherein cryptographic digital signature function is based upon the elliptic curve digital signature algorithm (ECDSA) protocol.

13. The non-transitory machine-readable storage medium of claim 10, wherein the entropy value $\delta$ based upon the input message is used to select bits for the nonce u from the white-box implementation of the cryptographic digital signature function.

14. The non-transitory machine-readable storage medium of claim 13, wherein the entropy value $\delta$ is based upon the hash of the input message input message.

15. The non-transitory machine-readable storage medium of claim 10, wherein computing a digital signature of the input using the nonce includes computing $s=u^{-1}(e+dr) \mod n$, where s is first part of the digital signature of the input message, u is the nonce, e is the hash of the input message, d is a private key, r is a calculated remainder that is a second part of the digital signature, and n is a secret integer.

16. The non-transitory machine-readable storage medium of claim 15, wherein where the remainder r is calculated as using an elliptic curve point multiplication.

17. The non-transitory machine-readable storage medium of claim 15, wherein where the remainder r is calculated as using a modular exponentiation function.

18. The non-transitory machine-readable storage medium of claim 10, further comprising instructions for performing an integrity check on the digital signature based upon nonce.

* * * * *